United States Patent [19]
Coulter

[11] Patent Number: 5,479,878
[45] Date of Patent: Jan. 2, 1996

[54] BIRD FEEDER

[76] Inventor: Don Coulter, 123 Shipley Street, Thunder Bay, Ontario, Canada, P7A 3C6

[21] Appl. No.: 330,566

[22] Filed: Oct. 28, 1994

[30] Foreign Application Priority Data

Jul. 22, 1994 [CA] Canada .................................. 2128661

[51] Int. Cl.⁶ ..................................................... A01K 39/00
[52] U.S. Cl. ......................................................... 119/51.03
[58] Field of Search .............................. 119/51.03, 57.8, 119/57.9

[56] References Cited

U.S. PATENT DOCUMENTS

| | | | |
|---|---|---|---|
| 1,596,333 | 8/1926 | Boyle | 119/51.03 |
| 3,273,537 | 9/1966 | Orr | 119/51.03 |
| 3,399,650 | 9/1968 | Goodman | 119/51.03 |
| 5,016,573 | 5/1991 | Power | 119/57.8 X |
| 5,036,795 | 8/1991 | Houghton | 119/17 |
| 5,111,772 | 5/1992 | Lipton | 119/57.9 |

FOREIGN PATENT DOCUMENTS

| | | | |
|---|---|---|---|
| 2275408 | 8/1994 | United Kingdom | 119/57.9 |
| 18824 | 9/1994 | WIPO | 119/57.9 |

*Primary Examiner*—Gene Mancene
*Assistant Examiner*—Thomas Price
*Attorney, Agent, or Firm*—Ezra Sutton

[57] ABSTRACT

A novel bird feeder is provided herein. The bird feeder includes a generally-cylindrical enclosure including an upper ring, a lower ring, a plurality of spaced-apart longitudinally-extending wires extending between the upper ring and the lower ring, and a plurality of spaced-apart encircling wires traversing the longitudinal wires. This provides bird entry portals of a first selected size to permit entry and exit of selected desirable birds of a desired size. An open bottom floor is provided by a plurality of mutually-transverse wires to provide openings of that first selected size. A selectively-removable, solid cylindrical cover rests atop the upper ring for removable securement atop the generally-cylindrical enclosure by means of a plurality of cooperative latches. An eyelet/hook combination is securely suspended from an interior face of the solid cylindrical cover for suspending a mass of bird food within the generally-cylindrical enclosure. Additional portals are provided by a hingedly-removable door which is defined by a rectangular wire frame and mutually-transverse wires connected thereto. The addition portals are of a second selected size which is larger than the first selected size. Chains, or the like, are provided for hanging the bird feeder from a suitable support.

4 Claims, 1 Drawing Sheet

BIRD FEEDER

BACKGROUND OF THE INVENTION

1. Field of the Invention

This invention relates to a combined bird shelter and bird feeder.

2. Description of the Prior Art

Many persons love song birds and would like to attract them to their place of dwelling. It is recognized that it is best to design the bird house of sufficient size and opening for a particular species of bird. However, it is most discouraging to purchase a house for a particular type of bird and then find that none appear, leaving the house useless. A bird house with a small portal may have that portal permanently enlarged with difficulty, but if it is found to be too large to prevent invasion by less desirable birds, correction is almost impossible.

If the homeowner is able to attract birds to a house on his property, it has been found that birds will generally reside there year round as long as sufficient and proper food is provided. However, a nearby feeding station may draw the larger and bullying-type birds, discouraging the smaller birds in the house and causing them to leave. A daily supply of food for the smaller birds living in the house would be effective if only the larger birds could be prevented from taking the food first.

For many of the smaller birds, the interior dimensions of a bird house fall into a single useful range. However, the portal dimensions are critical as to the choice of the birds. While smaller birds will sometimes nest in houses with large portals, they prefer a portal that will prevent the entry of predatory birds, bossy birds and animals such as squirrels, rats and the like.

It has been a problem in the past to provide bird feeders which are not disturbed by squirrels and other predators. Squirrels and other predators are constantly endeavouring to climb upon a bird feeder and not only drive away the birds but also to feed upon the seed and scatter it with consequent loss.

People observing and providing supplemental feed or drink to wild birds are often dismayed by the over aggressiveness of certain species of birds, and squirrels. In winter, in Canada, competing birds include: blue jays, grey jays, woodpeckers, starlings, and grosbeaks.

There is therefore a need for a squirrel-resistant bird feeder which would selectively limit the size of aggressive birds, while at the same time, allowing smaller, more timid birds, e.g., the blackcapped chickadee access to feed or drink unharassed, within an enclosure, while allowing maximum viewing opportunities to the providers.

It has been attempted to solve such problems by the provision of food dispenser having an integral protective outer housing of fine wire mesh. In such food dispenser, a number of separate entry/exit holes, each approximately 3 cm in diameter, were provided in the mesh walls of the housing so as to permit small birds to gain access to the space within the housing and therefore be able to eat the nuts, or the like, contained within the food dispenser. Because the outer housing was made of fine wire mesh, the birds had to use the entry/exit holes. It has been found that birds are reluctant to do this, perhaps because once inside the housing, they feel confined and unable to make a quick departure.

U.S. Pat. No. 2,230,058 patented Jan. 28, 1941 by J. C. Hornung provided a bird feeder including food dispensing hopper having a front wall terminating above the bottom of the hopper to form a food outlet. The hopper had a bottom portion extending beyond the outlet to provide a shelf to receive food from the outlet. A movable perch was normally arranged alongside the shelf to support a bird in feeding relation to the shelf. The perch was mounted for movement to a lowered position away from the shelf so that a bird on the perch could be out of feeding relation to the shelf. A counterbalance means cooperated with the mounting for yieldingly maintaining the perch in its normal position alongside the shelf with a bird on the perch under a given weight. It was also arranged to cause the perch to be moved to its lowered position by force of a bird thereon heavier than said given weight. In this patent, however, the birds remain on the outside and bird size is governed by weight.

U.S. Pat. No. 3,977,363 patented Aug. 31, 1976 by J. B. Fisher, Jr., provided a bird feeder which was alleged to be substantially squirrel-proof. The bird feeder had a removable top which could be lifted vertically to charge the feeder housing with seeds. The removable top was of special so-called inverted hip roof construction with the upper portion of the roof having a steep pitch and the lower eaves or border portion having an overhanging baffle-like construction of lesser pitch. This construction was said to make it quite difficult for the squirrel to find a support upon the roof and through the overhanging eaves to cause the squirrel to move away from the centre of the feeder which in turn caused swinging of the feeder to one side of the chain because of the weight displacement change and dumping of the squirrel from the feeder to the ground. Further, the feeder was constructed from a hard surface plastic to provide a hard, slick surface which made it difficult for the squirrel to find a surface for grasping or traction. The bird feeder housing was of an inverted frusto-conical configuration having a flat base and upwardly diverging sidewalls. The removable roof nested simply upon the upper portion of the housing and rested there upon only by gravity in a nested relationship. In this patent, however, there was no control of bird size.

U.S. Pat. No. 4,167,917 patented Sep. 18, 1979 by F. P. Noll provided a bird shelter and feeder which included an enclosure securely attached together of a pitched top, two upright side walls and a back upright wall. The detachable bottom floor was of a size which, when attached to the walls proximate to the bottom edge of the walls, extended horizontally past the front edge of the side walls to form a feeding platform. A shoulder system was provided on the feeding platform extension to prevent the feed from falling off the edges. The bottom floor was attached by providing a pair of adjacent horizontal grooves on the inner faces of the side walls in which projections from the edges of the bottom floor were slidably inserted to form the floor of the shelter and the feeding platform. A detachable front wall system included two separate wall section, the top front wall section having therethrough at least one portal, the size chosen to allow a predetermined size of bird to enter the shelter. A cover system was attached to the front wall extending horizontally over the feeding platform in such a position and size as to allow only the smaller species of birds to feed from the platform. A perch of suitable size and position was attached to the front wall system under the portal to allow a bird to alight and enter the shelter. The front wall system was detachably secured proximate to the front edges of the side walls such that the front wall system could be removed only upon detachment of the bottom floor. In this patent, there was no size restriction.

U.S. Pat. No. 4,798,172 patented Jan. 17, 1989 by S. G. Clarke provided a bird feeder having a body extending along a vertical axis, the body having an axially-extending shell with upper and lower wall portions. The upper wall portion had a convexly curved exterior surface extending around the axis and toward the lower portion. An axially-extending inner wall was positioned inside the shell. The upper wall portion of the shell and the inner wall defined an axially-extending reservoir therebetween. The lower wall portion of the shell and the inner wall defined an axially-extending chute therebetween. A transversely-extending feed tray was positioned inside the shell, a portion of the tray extending under a lower edge of the inner wall. The chute communicated between the reservoir and the tray portion. Spacers were disposed between the tray portion and the lower edge of the inner wall to maintain a space sufficient to allow seed to pass from the chute into the tray. An access opening was provided in the lower wall portion of the shell, the access opening communicating between the exterior of the shell and the tray.

U.S. Pat. No. 4,917,050 patented Apr. 17, 1990 by S. G. Clarke provided a bird feed having a bottom portion for delivering seed to a tray to which birds had access through a fly-up entry into a feeding area. The bottom portion included a dome with a central hole and a nearby filling port. There was also a cover with a central hole and a skirt portion which normally covered the filling portion. The central holes defined a bird feeder axis. A hanger had a straight portion above the cover and a hook portion. An eccentric cover lock had an aperture through which the straight hanger portion passed. Due to its eccentricity, the cover lock was normally held by gravity in a cocked position in which the aperture held the cover lock at any location on the straight hanger portion above the cover, including a lowermost location in which the skirt portion covered the filling port and the cover lock deterred the raising of the cover. The feeder also had a spring engageable with the hook portion and a mounting chain. The spring device was adapted suddenly to lift the bottom portion of the bird feeder when an animal released its grip on the straight hanger portion in attempting to reach the fly-up entry.

U.S. Pat. No. 5,016,573 patented May 21, 1991 by D. E. Power provided a bird observation enclosure which was selectively limiting and squirrel resistant. At least one feed or drink receptacle was installed within its interior confines. The enclosure was comprised of an open mesh body structure, ported by a plurality of circular openings, sealed by a closure on one end, the other end having at least one cover, for feed or drink replenishment. The enclosure comprised a squirrel-gnaw-resistant open mesh wire structure, generally cylindrical, closed at the lower end, the upper end having a removable squirrel-gnaw-resistant cover secured to the body with a semi-rigid hanging means. The hanging means functioning as an apparatus for cover retention and means for cover positioning alignment during feed or drink replenishment. The cover further included a handling means on its outer surface, for cover removal. On the inner surface fastening means were affixed for attaching a feed or drink receptacle. The weight of replenished feed or drink receptacle provided supplemental means for cover retention, thereby further increasing squirrel resistance. The vertical length of the body was in excess of the feed or drink receptacle installed within interior confines. The diameter of the body was such as to accommodate select birds, while they were clinging or perching on the feed or drink receptacle. The body walls contained a plurality of spaced-apart portions having substantially circular openings for the ingress/egress of birds, sized to admit only those desired selected limiting species. This feeder had non-adjustable manufactured circular openings. The construction of such feeder was complex and is not economical to manufacture.

U.S. Pat. No. 5,111,772 patented May 12, 1992 by L. Lipton provided a bird food dispensing system with a squirrel-proof housing. The patented housing defined an enclosed space for the food dispenser, entry into and exit from the enclosed space being provided by a band of contiguous apertures disposed around the housing. The dimensions of the apertures were such that, whilst they permitted small birds to pass, they were too small to permit a squirrel to pass through. The provision of a band of contiguous apertures ensured that there are many different entry and exit points available for use by the birds. Therefore, a bird, once inside the enclosed space, did not feel trapped and had the impression of merely being in a tree or the like. The housing included mounting means for mounting the food dispenser in the enclosed space, the mounting means extending into the enclosed space for holding the food dispenser out of contact with the ports of the housing that defined the periphery of the enclosed space. By spacing the food dispenser away from the walls of the housing, a squirrel was not able to break into the food dispenser whilst remaining outside the housing. This feeder is aimed at restricting squirrels but is not specifically selective enough as to bird sizes.

U.S. Pat. No. 5,203,281 patented Apr. 20, 1993 by M. B. Harwich provided a collapsible feeder and protective enclosure. The patented collapsible protective enclosure included a cylindrical sidewall having circumferential ribs and a mesh material therebetween having members sufficiently spaced from each other to allow the ingress and egress of the desired creatures while excluding larger animals. The sidewall further included a peripheral flange at each end of the protective enclosure to provide opened or closed ends. A feeding platform and ant guard assembly were also included. The protective enclosure could be hung in either a vertical or a horizontal orientation. This feeder was designed as a butterfly feeder and to restrict birds.

Canadian Patent No. 225,202 patented Oct. 24, 1922 by A. Angell Jr., provided a chicken feeder. The patented chicken feeder was adjustable in height so that it was suitable for chickens at different stages of their growth.

Canadian Patent No. 879,458 patented Aug. 31, 1971 by G. J. Schweitzer provided a poultry feeder which included an open-topped trough adapted to contain poultry feed. The trough had a bottom and at least an upstanding side wall. A first plurality of spaced circular apertures were arranged in seriatim in the wall. A member was slidably mounted on the wall, the member being provided with a second plurality of spaced and correspondingly-shaped apertures, which were slidably cooperating with the wall to provide a plurality of feeding apertures the entire configuration of each of which could be selectively adjustable from an elliptical shape to a circular shape. This permitted only the introduction of the head of a chick through the feeding aperture and into the trough, whilst inhibiting entry of the body of the chick into a feeding aperture and compensating for the growth of the heads of the chicks.

Canadian Patent No. 1,163,152 patented Mar. 6th, 1984 by S. G. Clarke provided a bird feeder which included a body extending along a vertical axis, the body having an axially-extending shell having upper and lower wall portions. The wall portions intersected along their peripheries in a plane transverse to the axis, the plane defining the maximum transverse section of the body. The upper wall portion had a convexly-curved exterior surface extending from the axis to the plane, and axially-extending wall means inside the shell. The upper wall portion of the shell and the wall means defined an axially-extending reservoir therebetween. The lower wall portion of the shell and the wall means defined an axially-extending chute therebetween. A transversely-extending feed tray was disposed inside the shell. The chute communicated between the reservoir and the tray. An access opening was provided in the lower wall portion of the shell, the access opening communicating between the exterior of the shell and the tray.

SUMMARY OF THE INVENTION

(i) Aims of the Invention

Thus, it will be seen that none of the above-identified patents provided an ideal bird enclosure and feeder.

Accordingly, one object of this invention is to provide a combination bird house and feeding station which allows the owner to change the size of the bird house portal and control the likelihood of a chosen species of bird that will inhabit the house.

Another object of this invention is to provide a bird feeder in conjunction with the bird house which will provide sufficient food for the family of birds therein, but will prevent larger birds from feeding at the station.

A specific object of this invention is to provide a bird house and feeding station combination that can easily be disassembled to clean out the house and feeding station and to change the size of the portal if desired.

A further object of this invention is to provide a bird house that provides protection from predatory birds and provides protection for the food placed in the feeding station.

Yet another object of this invention is to provide a means whereby the enclosure could be hung above the ground.

Still another object of this invention is to provide an enclosure which is easy to assembly, and is inexpensive to manufacture.

(ii) Statement of Invention

This invention provides a bird feeder comprising: a generally-cylindrical enclosure including an upper ring, a lower ring, a plurality of spaced-apart longitudinally-extending wires extending between the upper ring and the lower ring, and a plurality of spaced-apart encircling wires traversing the longitudinally-extending wires, the encircling wires and the longitudinally-extending wires thereby providing a plurality of bird entry portals of a first selected size therebetween, in order to permit entry and exit of selected desirable birds of a desired size; an open bottom floor provided by a plurality of mutually-transverse wires to provide a plurality of openings of that first selected size therebetween; a selectively-removable, solid cylindrical cover resting atop the upper ring for removable securement atop the open cylindrical shell; a plurality of cooperative latches for removably securing the cover to the generally-cylindrical enclosure; an eyelet/hook combination securely suspended from an interior face of the solid cylindrical cover for suspending a mass of bird food within the generally-cylindrical enclosure; additional portals which are provided by a hingedly-removable door, the door being defined by a rectangular wire frame and mutually-transverse wires connected thereto, to provide a plurality of additional portals therebetween of a second selected size, the second selected size being larger than the first selected size and (v) means for hanging the bird feeder from a suitable support.

(iii) Other Features of the Invention

By one feature of this invention, the bird feeder includes at least one, but preferably two, bird perches secured to a pair of entry portals the perch or perches extending along a chord of the generally-cylindrical enclosure, and being disposed within the bird feeder.

Another feature of this invention provides such bird feeder wherein the means for hanging the bird feeder comprises three equi-circumferentially-spaced-apart hooks, a respective chain being secured to each of the three hooks, the three chains being secured to a single ring.

BRIEF DESCRIPTION OF THE DRAWINGS

In the accompanying drawings.

DESCRIPTION OF PREFERRED EMBODIMENTS

Figure 1:
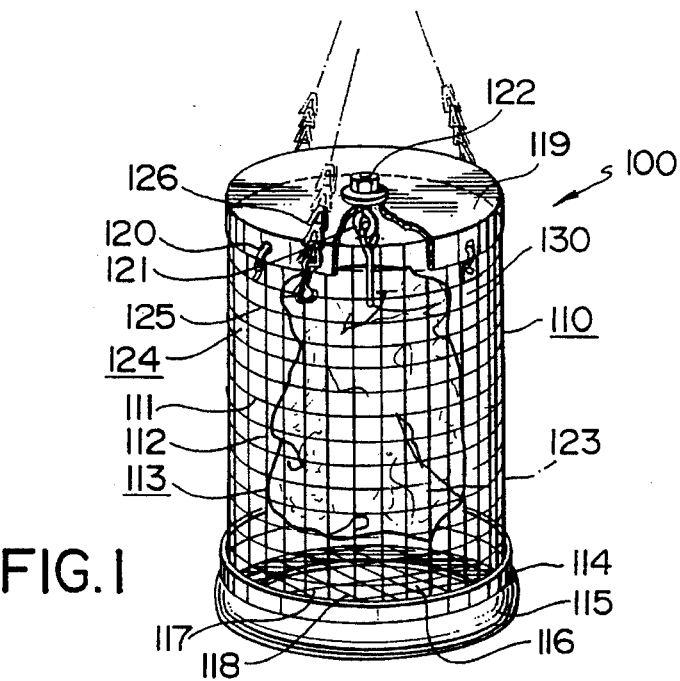
FIG. 1 is a perspective view of a bird feeder of one embodiment of this invention.

(i) Description of FIG. 1

As seen in FIG. 1, the bird feeder 100 is a generally cylindrical enclosure 110. The enclosure 110 includes a plurality of encircling wires 111 and a plurality of wires 112 transverse thereto. These wires 111,112 define a plurality of rectangular portals 113 therebetween. With different orientations of wires 111,112, different shaped portals 113 may be provided. The spacing of the wires 111,112 is selected to permit entry and exit of selected desirable birds, while excluding entry to other birds and pests including mice, rats and squirrels.

The enclosure 110 is provided with a bottom ring 114 to provide the support for a circular base 115 provided with an open mesh floor 116 defined by a plurality of mutually-transverse wires 117,118 to provide rectangular openings suitable in size for selected desirable birds, while excluding entry to other birds and pests including mice, rats and squirrels.

The enclosure 110 is provided with a selectively-removable, solid circular cover 119 which is provided with cooperative latches 120 to permit either securement of the cover 119 to the enclosure 110 or removal thereof. The cover 119 is provided with an eye 121 and nut 122 securement to the centre of the cover 119 to provide the eye 121 within the enclosure 110. Suspended from the eye 121 at any desired level is a suitable bird food, i.e., a cylindrical mass of pork fat, or of cohesively-bound-together seeds or nuts, etc. In this embodiment, a cylindrical mass of pork fat 130 is shown.

The cylindrical wall 124 of the enclosure is provided with hooks 125, i.e., three hooks 125, which are equicircumferentially-spaced-apart. To an end of each of the hooks 125 is secured to a chain 126, the three chains 126 being secured to a ring (not seen) by means of which the bird feeder 100 may be suspended to a suitable surface.

Figure 2:
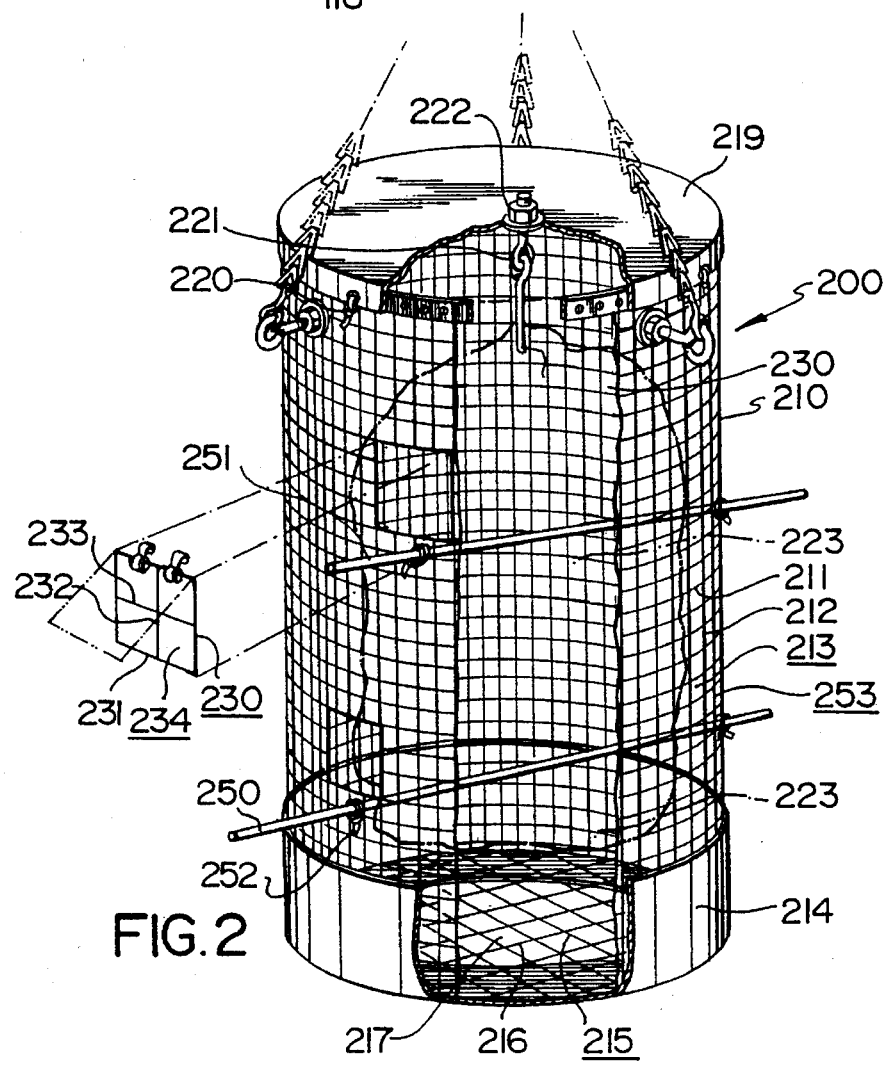
FIG. 2 is a perspective view of a bird feeder of a second embodiment of the invention.

(ii) Description of FIG. 2

As seen in FIG. 2, the bird feeder 200 is a generally cylindrical enclosure 210. The enclosure 210 includes a plurality of encircling wires 211 and a plurality of wires 212 transverse thereto. These wires 211,212 define a plurality of rectangular portals 213 therebetween. With different orientations of wires 211,212, different shaped portals 213 may be provided. The spacing of the wires 211,212 is selected to permit entry and exit of selected desirable birds, while excluding entry to other birds and pests including mice, rats and squirrels.

The enclosure 210 is provided with a bottom ring 214 to provide the support for a circular floor 215 provided by a plurality of mutually-transverse wires 216,217 to provide rectangular openings suitable in size for selected desirable birds, while excluding entry to other birds and pests including mice, rats and squirrels.

The enclosure 210 is provided with a selectively-removable solid circular cover 219 resting on an upper ring which is provided with cooperative latches 220 to permit either securement of the cover 219 to the enclosure 210, or removal therefrom. The cover 219 is provided with an eye 221 and nut 222 securement to the centre of the cover 219 to provide the eyelet 221 within the enclosure 210. Suspended from the eyelet 221 at any desired level by means of a hook is a suitable bird food, i.e., a cylindrical mass of pork fat, or of seeds cohesively-bound together, or nuts, etc. In this embodiment, two cylindrical masses of pork fat, or of adhered seeds or nuts 230 are shown.

This embodiment includes two additional improvements. One improvement is a removable door 230 which is provided by a perimetral wire frame 231 and mutually transverse wires 232,233 to provide rectangular portals 234 which are larger than the rectangular portals 213 in the enclosure 210.

The second improvement is a pair of perches 250,251, each lashed by wires 252 to the cylindrical wall 253 of the enclosure 210.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A bird feeder comprising:
   (i) a generally cylindrical enclosure including an upper ring, a lower ring, a plurality of spaced-apart longitudinally-extending wires extending between said upper ring and said lower ring, and a plurality of spaced-apart encircling wires traversing said longitudinally-extending wires, said encircling wires and said longitudinally-extending wires thereby providing a plurality of bird entry portals therebetween of a first selected size to permit entry and exit of selected desirable birds of a desired size;
   (ii) an open bottom floor provided by a plurality of mutually-transverse wires to provide a plurality of openings of said first selected size therebetween;
   (iii) a selectively-removable, solid cylindrical cover resting atop said upper ring, for removable securement atop said generally-cylindrical enclosure;
   (iv) a plurality of cooperative latches removably securing said cover to said generally-cylindrical enclosure;
   (v) an eyelet/hook combination securely suspended from an interior face of said solid cylindrical cover for suspending a mass of bird food within said generally-cylindrical enclosure;
   (vi) additional portals provided by a hingedly-removable door defined by a rectangular wire frame and mutually-transverse wires connected thereto, to provide a plurality of additional portals therebetween, said additional portals being of a second selected size which is larger than said first selected size; and (vii) means attached to said enclosure for hanging said bird feeder from a support.

2. The bird feeder of claim 1 including at least one bird perch secured to a pair of said bird entry portals, said perch extending along a chord of said cylindrical shell and being disposed within said bird feeder.

3. The bird feeder of claim 2 wherein there are two longitudinally-spaced-apart said bird perches.

4. The bird feeder of claim 1 wherein said means for hanging said bird feeder comprise three equi-circumferentially-spaced-apart hooks, and a separate chain which is secured to each of said three hooks, said three chains being secured to a single ring.

* * * * *